(12) United States Patent
Uchida et al.

(10) Patent No.: US 7,933,091 B2
(45) Date of Patent: Apr. 26, 2011

(54) MAGNETIC DISK DRIVE AND CONTROL METHOD THEREOF

(75) Inventors: Hiroshi Uchida, Kanagawa (JP); Hideki Ohzeki, Kanagawa (JP)

(73) Assignee: Hitachi Global Storage Technologies, Netherlands B.V., Amsterdam (NL)

(*) Notice: Subject to any disclaimer, the term of this patent is extended or adjusted under 35 U.S.C. 154(b) by 0 days.

(21) Appl. No.: 12/283,561

(22) Filed: Sep. 11, 2008

(65) Prior Publication Data
US 2009/0073601 A1   Mar. 19, 2009

(30) Foreign Application Priority Data
Sep. 14, 2007   (JP) .............................. 2007-239381

(51) Int. Cl.
*G11B 5/596* (2006.01)
(52) U.S. Cl. .................................................. 360/77.04
(58) Field of Classification Search .................. None
See application file for complete search history.

(56) References Cited

U.S. PATENT DOCUMENTS

| | | | | |
|---|---|---|---|---|
| 5,369,345 A * | 11/1994 | Phan et al. | ...................... | 318/561 |
| 6,532,129 B1 * | 3/2003 | Sri-Jayantha et al. | ...... | 360/77.02 |
| 6,549,349 B2 * | 4/2003 | Sri-Jayantha et al. | .......... | 360/31 |
| 6,567,230 B1 * | 5/2003 | Kagami et al. | ................... | 360/75 |
| 6,751,043 B2 * | 6/2004 | Magee et al. | ............... | 360/77.02 |
| 6,853,512 B2 | 2/2005 | Ozawa | | |
| 7,206,162 B2 * | 4/2007 | Semba et al. | ............... | 360/78.04 |
| 7,315,430 B2 * | 1/2008 | Kisaka | ...................... | 360/77.04 |
| 7,468,857 B2 * | 12/2008 | Hutsell et al. | ............... | 360/77.03 |

FOREIGN PATENT DOCUMENTS

| CN | 1242573 A | 1/2000 |
|---|---|---|
| CN | 1434972 A | 8/2003 |
| CN | 1941089 A | 4/2007 |

* cited by examiner

*Primary Examiner* — K. Wong

(57) ABSTRACT

Embodiments of the present invention provide a magnetic disk drive capable of easily suppressing degradation of position error caused by disturbance resulting from vibration from the outside. According to one embodiment, the magnetic disk drive acquires, during a period of time of track following control, data necessary for determining a filtering characteristic required to newly be specified in a peak filter; in association with the start of subsequent seek control, determines the filtering characteristic required to be specified in the peak filter; and specifies the determined filtering characteristic in the peak filter.

7 Claims, 10 Drawing Sheets

| NUMBER OF SEEKS | 1 | 2 | 3 | 4 | 5 | 6 | 7 | 9 | 10 | 11 | 12 |
|---|---|---|---|---|---|---|---|---|---|---|---|
| SIGN OF S | + | + | + | + | − | + | − | − | − | + | + |
| UPDATE AMOUNT (dE) | 0 | 1 | 2 | 3 | 0 | 0 | 0 | −1 | −2 | 0 | 1 |

| OSH CNT | INCREASING THRESHOLD VALUE | REDUCING THRESHOLD VALUE |
|---|---|---|
| 0 | 2000h | 0000h |
| 1 | 2400h | 1C00h |
| 2 | 2800h | 2000h |
| 3 | 2C00h | 2400h |
| 4 | 3000h | 2800h |
| 5 | 7FFFh | 2C00h |

MAGNETIC DISK DRIVE AND CONTROL METHOD THEREOF

CROSS-REFERENCE TO RELATED APPLICATION

The instant nonprovisional patent application claims priority to Japanese Patent Application No. 2007-239381 filed Sep. 14, 2007 and which is incorporated by reference in its entirety herein for all purposes.

BACKGROUND OF THE INVENTION

In a magnetic disk drive such as for a hard disk, when a vibration such as a rotation vibration is exerted thereon from the outside, an external disturbance ("disturbance") resulting from the vibration acts on a position control system of a magnetic head, thereby leading to inhibition of positioning of the magnetic head. Hence, a countermeasure is taken to suppress degradation of a position error resulting from the disturbance caused by the external vibration.

As one countermeasure as mentioned above, a technique utilizing a chasing peak filter is disclosed in Japanese Patent Publication No. 2003-109335 ("Patent Publication 1"). This technique progressively causes approximation of the peak frequency of the peak filter to the frequency of the disturbance, thereby to suppress the disturbance that acts on the position control system of the magnetic head.

According to the technique utilizing the chasing peak filter, a parameter of the peak filter is updated on the basis of a sample or predetermined sample of an error signal indicative of the position error of the magnetic head during track following, which causes the magnetic head to follow tracks of the magnetic disk.

In this case, however, since the parameter has to be updated by taking stability of the peak filter into consideration, an update range of the peak frequency is restricted, and hence it takes time until the disturbance is suppressed.

Further, for magnetic disk drives, a burden of calculations necessary to suppress disturbances as described above, is required to be reduced.

BRIEF SUMMARY OF THE INVENTION

Embodiments of the present invention provide a magnetic disk drive capable of easily suppressing degradation of position error caused by disturbance resulting from vibration from the outside. As shown in the particular embodiments of FIGS. 2 and 3, the magnetic disk drive acquires, during a period of time of track following control, data necessary for determining a filtering characteristic required to newly be specified in a peak filter 35 (S3); in association with the start of subsequent seek control, determines the filtering characteristic required to be specified in the peak filter 35 (S4), and specifies the determined filtering characteristic in the peak filter 35 (S5).

BRIEF DESCRIPTION OF THE DRAWINGS

FIG. 8 is a view showing an example of the contents of a gain specification table.

DETAILED DESCRIPTION OF THE INVENTION

Figure 1:
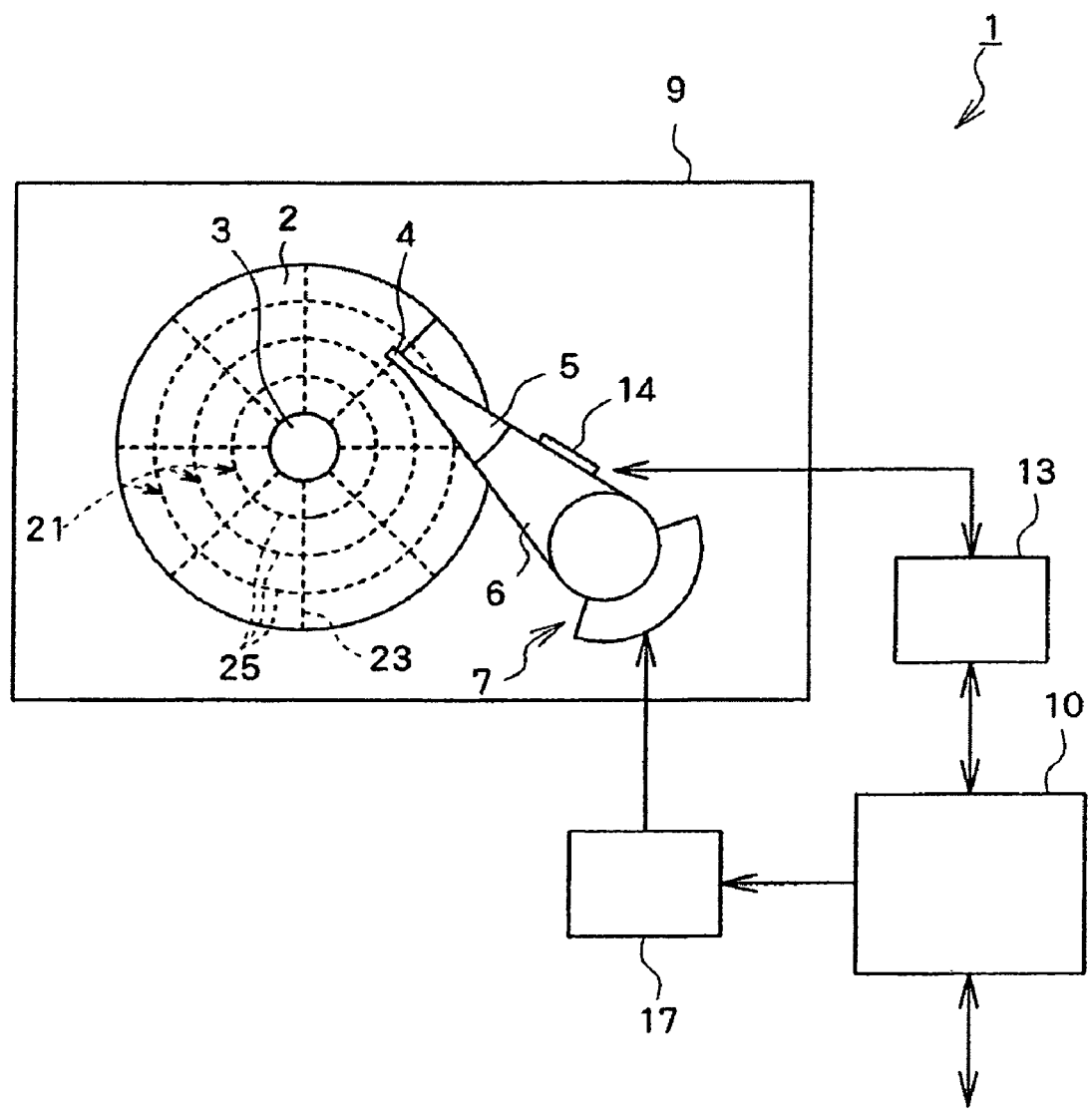
FIG. 1 is a block diagram showing an example of the configuration of a magnetic disk drive according to one embodiment of the present invention.

Embodiments of the present invention relate to a magnetic disk drive and a control method therefor.

Embodiments of the present invention provide a magnetic disk drive and a method therefore that are capable of easily suppressing degradation of a position error caused by a disturbance resulting from an external vibration.

A magnetic disk drive of embodiments of the present invention comprises a magnetic disk whereon data is recorded on a plurality of tracks; a magnetic head that moves relative to the magnetic disk to read out the data; an error signal generation circuit that, in accordance with data read out by the magnetic head, generates an error signal indicative of a position error of the magnetic head with respect to a target track determined from among the plurality of tracks; a filter circuit that filters the error signal in correspondence to a filtering characteristic specified; a position control circuit that alternately executes track following control and seek control, the track following control causing the magnetic head to, follow the target track in accordance with the error signal filtered, and the seek control causing the magnetic head to move towards a new target track that is an other track than the target track; a specification updating circuit that determines the filtering characteristic, which is required to be specified in the filter circuit, in accordance with the error signal generated during a period of time when the track following control is being executed and that specifies the determined filtering characteristic in the filter circuit in association with the start of the seek control that is executed before the subsequent track following control.

In one mode of embodiments of the present invention, the specification updating circuit specifies at least one of a gain and a peak frequency of the filter circuit as the filtering characteristic.

In one mode of embodiments of the present invention, the specification updating circuit includes a frequency estimating section that estimates a frequency of a disturbance contained in the error signal generated during the period of time when the track following control is being executed; and a frequency specifying section that specifies a peak frequency of the filter circuit in correspondence to the estimated frequency of the disturbance.

In the one mode described immediately above, the frequency estimating section determines a comparative level relation between the frequency of the disturbance and the peak frequency of the filter circuit on the basis of the period of time when the track following control is being executed; and the frequency specifying section determines an update range of the peak frequency of the filter circuit in accordance with a comparative level relation determined during a target period of time and a comparative level relation determined during a period of time therebefore.

In one mode of embodiments of the present invention, the specification updating circuit includes an intensity estimating section that estimates an intensity of a disturbance contained in the error signal generated during the period of time when the track following control is being executed; and a gain specifying section that specifies a gain of the filter circuit in correspondence to the estimated intensity of the disturbance.

In the one mode described immediately above, the intensity estimating section estimates the intensity of the disturbance in accordance with an internal variable of the filter circuit, the internal variable changing in correspondence to the magnitude of the error signal.

Further, the intensity estimating section estimates the intensity of the disturbance in accordance with an intensity evaluation value obtained by multiplying the internal variable of the filter circuit by a correction value corresponding to the peak frequency of the filter circuit.

Further, the intensity estimating section estimates the intensity of the disturbance in accordance with a maximum value of the intensity evaluation value during the period of time when the track following control is being executed.

Further, according to the gain specifying section, in relation to a threshold value of the intensity evaluation value in a case where the gain of the filter circuit is increased from a predetermined level, a threshold value in a case where the gain of the filter circuit is decreased from a predetermined level is specified to be low.

Further, the gain specifying section causes the internal variable of the filter circuit to be reduced in association with causing the gain of the filter circuit to be increased, and causes the internal variable of the filter circuit to be increased in association with causing the gain of the filter circuit to be reduced.

A control method for a magnetic disk drive according to embodiments of the present invention operates for a magnetic disk drive set as a target including a magnetic disk whereon data is recorded on a plurality of tracks; a magnetic head that moves relative to the magnetic disk to read out the data; an error signal generation circuit that, in accordance with data read out by the magnetic head, generates an error signal indicative of a position error of the magnetic head with respect to a target track determined from among the plurality of tracks; a filter circuit that filters the error signal in correspondence to a filtering characteristic specified; and a position control circuit that alternately executes track following control and seek control, the track following control causing the magnetic head to follow the target track in accordance with the error signal filtered, and the seek control causing the magnetic head to move towards a new target track that is another track than the target track, the control method comprising a step of determines the filtering characteristic, which is required to be specified in the filter circuit, in accordance with the error signal generated during a period of time when the track following control is being executed; and a step of specifying the determined filtering characteristic in the filter circuit in association with the start of the seek control that is executed before the subsequent track following control.

According to embodiments of the present invention, the filtering characteristic is specified in the filter circuit in association with the start of the seek control. As such, different from the conventional case where, for example, updating is performed on the sampling basis, the control system may be handled as a time-invariant system, so that a restriction on the update range of the filtering characteristic is alleviated, thereby enabling the application of a sufficient update range.

In particular, during the seek control (more specifically, in a period of time until the subsequent track following control is started), since a period of time for convergence of transient response of the filter circuit may be secured, a sufficient update range may be applied.

Further, in a state where seek control is frequently executed, such as a state where, for example, the number of requests for access to data is large, a sufficient number of times of specification of the filtering characteristic of the filter circuit may be secured.

Further, the burden of calculations associated with control is reduced, compared to conventional per-sample based updating.

Embodiments of the present invention will be described with reference to the drawings.

FIG. 1 shows an example of the configuration a magnetic disk drive 1 of one embodiment of the present invention. The magnetic disk drive 1 includes a magnetic disk 2, a spindle motor 3, a magnetic head 4, a suspension arm 5, a carriage 6, a voice coil motor 7, and a head amplifier 14 in a housing 9.

The magnetic disk drive 1 further includes a main control circuit 10, a read/write channel 13 (R/W channel), and a motor driver 17 on a baseboard external of the housing 9.

The magnetic disk 2 is rotationally driven by the spindle motor 3. Multiple tracks 21 are formed in a concentric circular arrangement on the magnetic disk 2. Further, on the respective tracks 21, servo data areas 23 are formed in arrangement at a predetermined interval along the circumferential direction, and user data areas 25 positioned therebetween are formed.

Servo data is recorded in the servo data area 23. The servo data includes address data and a burst signal. The burst signal is a signal that is used for calculating a relative position of the magnetic head 4 with respect to the track 21. In the user data area 25, user data is recorded.

The magnetic head 4 is mounted in a leading edge portion of the suspension arm 5 and is supported over the magnetic disk 2. The suspension arm 5 is mounted with a base end side thereof fitted to the carriage 6 that is pivotally supported to the housing 9. The voice coil motor 7 pivotally drives the carriage 6, thereby to move the magnetic head 4 substantially in the radial direction on the magnetic disk 2.

The main control circuit 10 includes a microprocessing unit (MPU) and a memory such as a ROM or RAM. The main control circuit 10 reads out and executes programs stored in the memory, thereby to implement various types of control, such as position control of the magnetic head 4 and recording/playback control of data. In the present embodiment, the main control circuit 10 functions as a position control circuit. The function will be described in detail below.

The main control circuit 10 identifies the current position of the magnetic head 4 in accordance with servo data input from the R/W channel 13, generates a control signal that causes the magnetic head 4 to be positioned on a target track, and then outputs the signal to the motor driver 17. The motor driver 17 performs analog conversion and amplification of the control signal and outputs the signal to the motor driver 17.

The main control circuit 10 further includes a hard disk controller (HDC) and a buffer memory. The HDC includes, for example, an interface controller, an error correction circuit, and a buffer controller.

Upon receipt of user data to be recorded onto the magnetic disk 2 from an external host, the main control circuit 10 outputs the user data to the R/W channel 13. Further, when the demodulated user data is input from the R/W channel 13, the main control circuit 10 transmits the user data to the external host. Further, the main control circuit 10 causes the user data to be temporarily stored into the buffer memory.

When the user data is input from the main control circuit 10, the R/W channel 13 modulates and outputs the user data to the head amplifier 14. Further, when the amplified playback signal is input from the head amplifier 14, the R/W channel 13 converts the playback signal into digital data, and demodulates and outputs the data to the main control circuit 10. Further, the R/W channel 13 extracts servo data from the playback signal at a predetermined sampling interval and outputs the data to the main control circuit 10.

When the modulated user data is input from the R/W channel 13, the head amplifier 14 converts the user data into a recording signal and outputs it to the magnetic head 4. Further, when a playback signal read out from the magnetic disk 2 is input from the magnetic head 4, the head amplifier 14 amplifies and outputs the playback signal to the R/W channel 13.

When the recording signal is input from the head amplifier 14, the magnetic head 4 applies a recording magnetic field corresponding to the recording signal to the magnetic disk 2. Thereby, a magnetization representative of user data is recorded onto the magnetic disk 2. Further, the magnetic head 4 reads out, as a playback signal, a magnetic field leaked from the magnetization recorded on the magnetic disk 2, and outputs the playback signal to the head amplifier 14.

Position control of the magnetic head 4 will be described hereinbelow. As positioning control of the magnetic head 4, the main control circuit 10 alternately executes seek control and track following control.

In the seek control, the main control circuit 10 causes the magnetic head 4 to move towards a target track determined in accordance with a recording signal or playback signal received from the external host. More specifically, the main control circuit 10 identifies a current position of the magnetic head 4 in accordance with servo data input from the R/W channel 13, obtains a distance between the target track and the current position, generates a control signal corresponding to the distance, and outputs the signal to the motor driver 17.

When the magnetic head 4 has reached the target track through the seek control, the main control circuit 10 shifts to the track following control.

In the track following control, the main control circuit 10 causes the magnetic head 4 to follow the reached the target track. More specifically, the main control circuit 10 generates a position-error suppression control signal in accordance with an error signal (PES: position error signal) representative of a position error of the magnetic head 4 with respect to a target track, and outputs the signal to the motor driver 17. The position error of the magnetic head 4 is obtained in accordance with a burst signal contained in the servo data.

A read/write of data by the magnetic head 4 is executed under the track following control.

Thereafter, when a new track is designated as a target track, the main control circuit 10 shifts to the seek control, thereby to cause the magnetic head 4 to move towards the new target track. In this manner, the seek control and the track following control are alternately executed.

Figure 2:
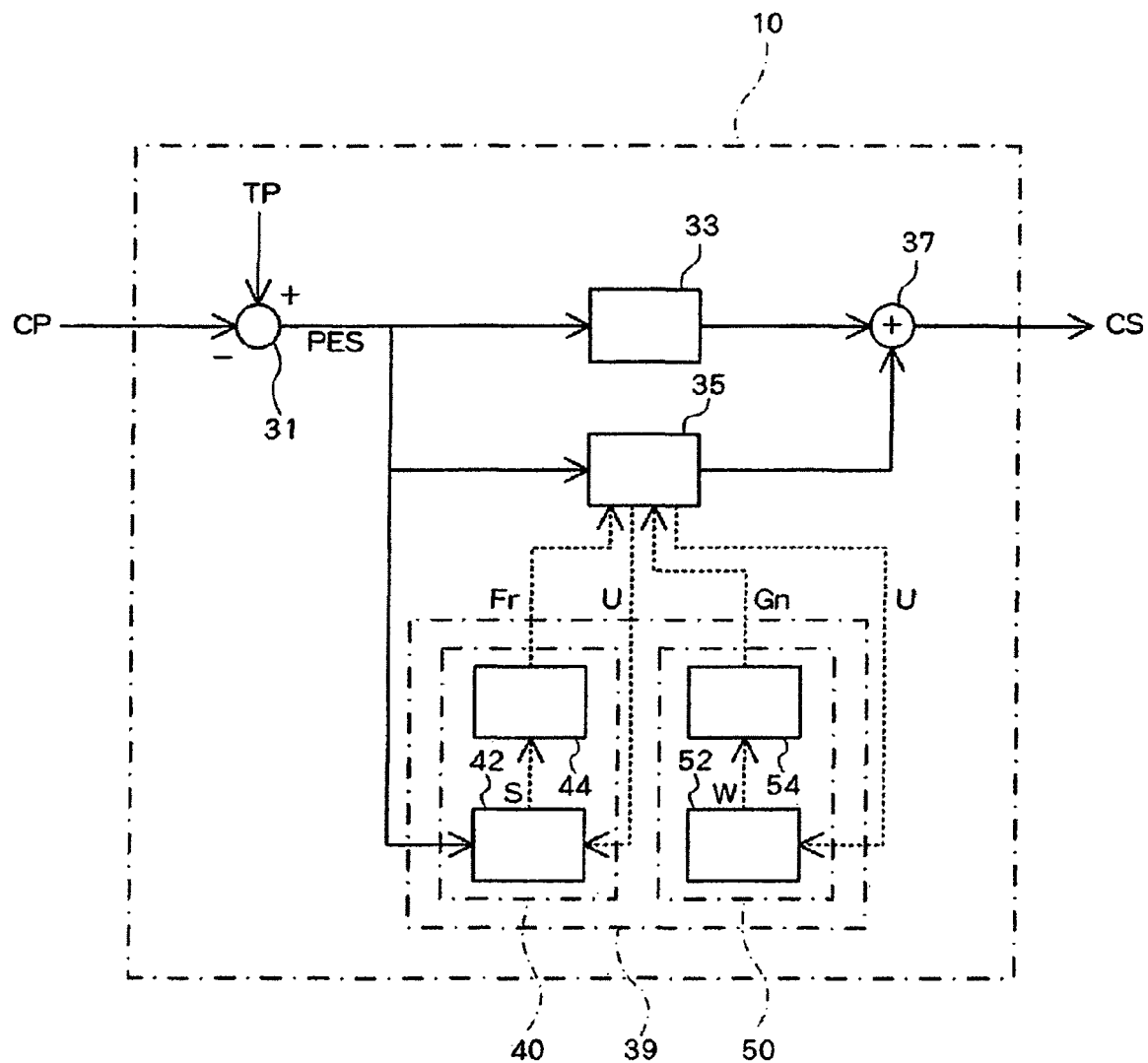
FIG. 2 is a block diagram showing an example of operation of a main control circuit.

FIG. 2 shows an example of the functional configuration of the main control circuit 10 in the event of track following control. In accordance with software-based operation of the MPU, the main control circuit 10 functionally includes an error signal generation circuit 31, a controller 33, a peak filter 35, an adder 37, and a specification updating circuit 39.

The error signal generation circuit 31 generates an error signal PES by obtaining a differential between a target position TP of the magnetic head 4, which is determined in accordance with a recording instruction or playback instruction issued from the external host, and a target position CP of the magnetic head 4, which is identified in accordance with servo data input from the R/W channel 13.

In this case, when an external vibration, such as a rotation vibration is exerted on a holding system of the magnetic head 4, the influence thereof affects the current position CP and is included as disturbance into the error signal PES.

The controller 33 generates a position-error suppressing signal in accordance with an error signal PES input from the error signal generation circuit 31, and outputs the signal to the adder 37.

The peak filter 35 filters the error signal PES input from error signal generation circuit 31 and outputs the signal to the adder 37. More specifically, the peak filter 35 amplifies a frequency component of a peak frequency of the error signal PES, and generates a signal at the opposite phase and adds it to the adder 37.

The adder 37 adds together the signal output from the controller 33 and the signal output from the peak filter 35, and outputs a resultant signal obtained through the addition to the motor driver 17 to be as a control signal CS that is used to drive the voice coil motor 7.

In the above, the signal output from the controller 33 is a signal that is used to cause the magnetic head 4 to follow the target track, and the signal output from the peak filter 35 is a signal that is used to cancel the influence imposed on the holding system of the magnetic head 4. Thereby, the control signal CS, which has been output from the adder 37, is made into a state where a component having disturbance contained in the error signal PES is suppressed.

In the peak filter 35, an internal variable (a state variable of an internal model) is updated by an update signal Fr, Gn output from the specification updating circuit 39, whereby a filtering characteristic thereof is specified. The filtering characteristic, which is thus specified, includes a peak frequency and a gain (peak gain) at the peak frequency. Further, the characteristic may include peak width.

The specification updating circuit 39 includes a frequency specification updating unit 40 and a gain specification updating unit 50, in which the frequency specification updating unit 40 outputs the update signal Fr, which is used to specify the peak frequency, and the gain updating unit 50 outputs the update signal Gn, which is used to specify the peak gain. Details of functions of these units will be described in detail below.

The peak filter 35 will be described hereinbelow by using equations. An internal variable U of the peak filter 35 may be expressed Equation 1 or 2 shown below. In addition, an output $Pk_{out}$ of the peak filter 35 may be expressed as Equation 3 or 4 shown below.

$$U(n) = \frac{z^2}{z^2 - E \cdot z - F} \cdot PES(n) \qquad \text{Equation 1}$$

$$U(n) = PES(n) + E \cdot U(n-1) + F \cdot U(n-2) \qquad \text{Equation 2}$$

$$Pk_{out}(n) = 2^{OSHCNT} \cdot \frac{P \cdot z^2 + Q \cdot z + R}{z^2} \cdot U(n) \qquad \text{Equation 3}$$

$$Pk_{out}(n) = 2^{OSHCNT} \cdot \left[ \begin{array}{c} P \cdot U(n) + Q \cdot U(n-1) + \\ R \cdot U(n-2) \end{array} \right] \qquad \text{Equation 4}$$

In the above, PES=error signal; E, F, P, Q, and R=parameter; OSHCNT=bit shift amount for adjusting the gain; z:1=operator for advancing the sampling time; and n=sampling time.

Among the above, the parameter E included in the internal variable U is a parameter that determines the peak frequency of the peak filter 35, and may be expressed as Equation 5 shown below.

$$E = A_0 \cdot \cos(2 \cdot \pi \cdot f_0 \cdot Ts) \qquad \text{Equation 5}$$

In the above, f0=peak frequency of the peak filter 35; and TS: sampling interval.

As such, by updating the parameter E of the peak filter 35, the specification updating circuit 39 is enabled to specify the peak frequency f0.

Further, by updating the bit shift amount OSHCNT, which is used to adjust the gain, the specification updating circuit 39 is enabled to adjust the gain of the peak filter 35. In the present embodiment, the peak gain (the gain at the peak frequency) is specified by adjustment of the gain of the peak filter 35.

Figure 3:
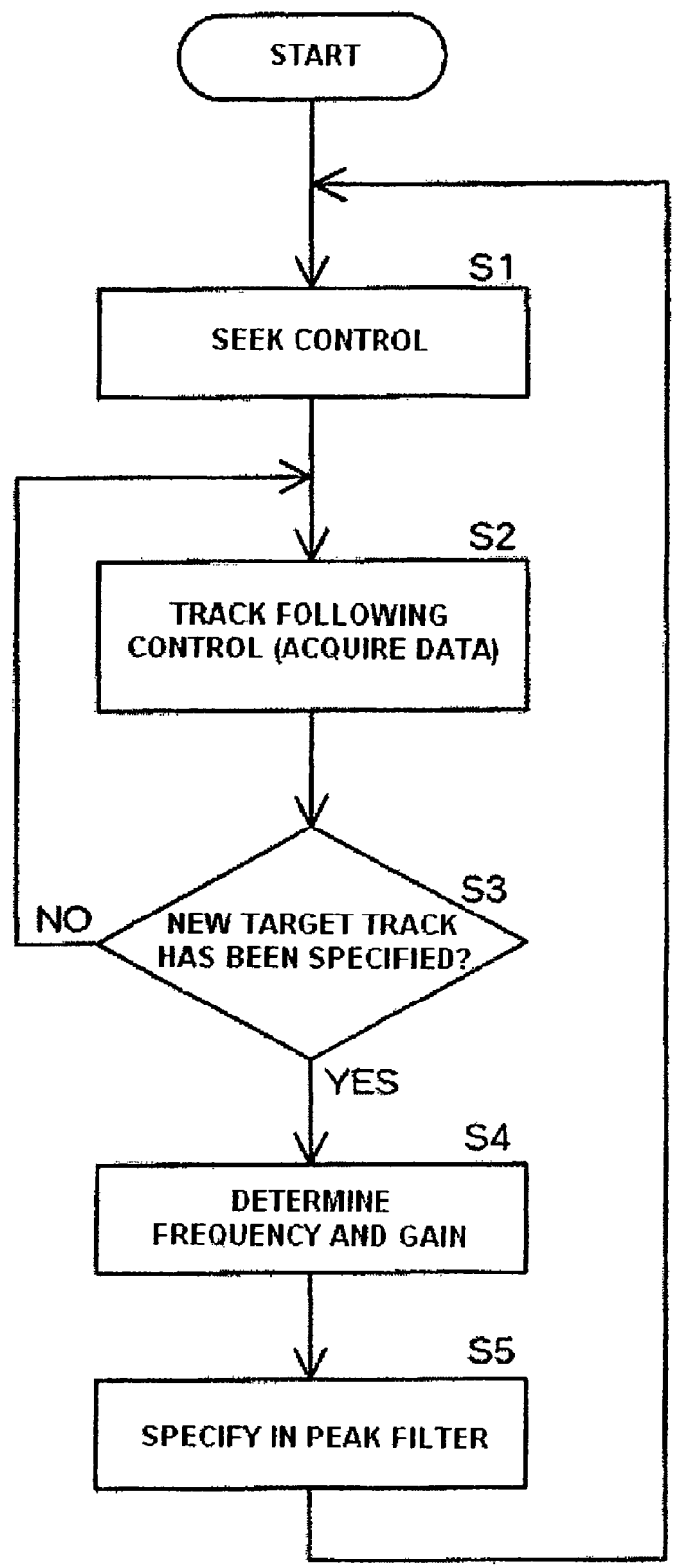
FIG. 3 is a flow chart showing an example of the operation of the main control circuit.
Figure 4:
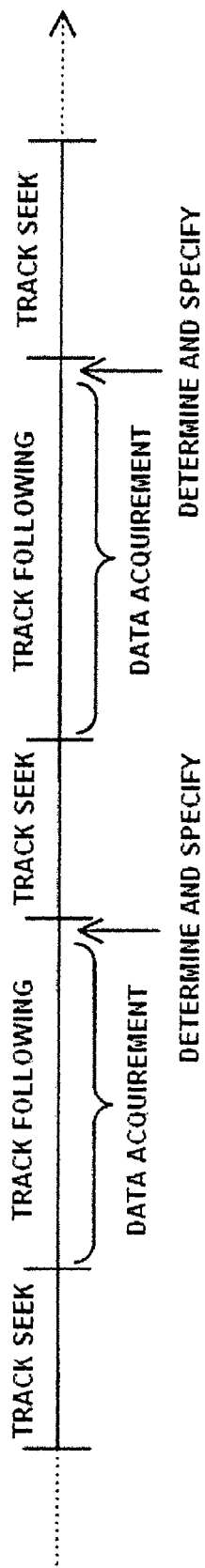
FIG. 4 is an explanatory view of an example of the operation of the main control circuit.

FIG. 3 shows a flow chart representing an example of operation of the main control circuit 10. Further, FIG. 4 shows an explanatory view of the example of operation of the main control circuit 10.

To begin with, the main control circuit 10 executes seek control, thereby to cause the magnetic head 4 to move towards a target track (S1).

When the magnetic head 4 has reached the target track, the main control circuit 10 executes track following control, thereby to cause the magnetic head 4 to follow the target track (S2). Further, the main control circuit 10 performs a data write or read while causing the magnetic head 4 to follow the target track.

Further, during the period of the track following control, the specification updating circuit 39 included in the main control circuit 10 acquires data necessary to determine filtering characteristic that is to be specified in the peak filter 35.

The data to be acquired is composed of an error signal PES, which is input from the error signal generation circuit 31, and the internal variable U, which is input from the peak filter 35 (see FIG. 2). They are input into the specification updating circuit 39 on a sampling basis.

While in the present embodiment the data is acquired on the sampling basis, the filtering characteristic is not updated on the sampling basis, unlike the manner according to the conventional technique.

Then, when a target track is specified (S3: YES), the specification updating circuit 39 determines a peak frequency and a peak gain, which are to be specified for the peak filter 35, in accordance with the data during the period of time of the track following control before the seek control is reexecuted (S4). Then, the specification updating circuit 39 outputs an update signal Fr, Gn and specifies the determined peak frequency and peak gain in the peak filter 35 (S5). A method of determining them will be described in detail below.

Thereafter, the main control circuit 10 shifts to the seek control, whereby the magnetic head 4 is moved towards a new target track (S1), and the operation as described above is iterated.

As described above, while the filtering characteristic of the peak filter 35 is not updated on the sampling basis, it is specified in association with the start of the seek control, the control system is handled as a time-invariant system, and hence a restriction on an update range of the filtering characteristic are alleviated. Consequently, the update range may be widened, as compared to the conventional case. Further, even when the update range is widened, transient responses of the peak filter 35 may be converged during the seek control (that is, until the subsequent operation of the track following control is started). Consequently, the period of time until the disturbance contained in the error signal PES is suppressed may be reduced.

Further, the method of specifying the filtering characteristic in the peak filter 35 in association with the start of the seek control is well suited against disturbance caused due to external vibration (especially, disturbance due to the rotation vibration (so-called "RV disturbance"). More specifically, when position error of the magnetic head 4 is degraded by external vibration, read/write operations may often be inhibited, however they may be succeeded through retries. Consequently, the filtering characteristic of the peak filter 35 may be specified so that the disturbance is suppressed in the course of performing the subsequent, iterative seek control.

In particular, in a situation where the number of data write or read requests are large and performance degradation due to degradation of positioning accuracy becomes prominent, the seek control is frequently executed. Hence, a sufficient number of updates of the filtering characteristic of the peak filter 35 may be secured, and consequently, the filtering characteristic of the peak filter 35 may be quickly and appropriately specified.

Frequency Specification Updating Unit 40

The frequency specification updating unit 40 included in the specification updating circuit 39 will be described herebelow. As shown in FIG. 2, the frequency specification updating unit 40 includes a frequency estimating section 42 and a frequency specifying section 44.

In accordance with the error signal PES input from the error signal generation circuit 31 and the internal variable U input from the peak filter 35, the frequency estimating section 42 estimates the frequency of the disturbance contained in the error signal PES.

For estimation of the disturbance frequency, a frequency estimating technique using a chasing peak filter described in Patent Publication 1 described above may be applied.

More specifically, the frequency estimating section 42 determines a comparative level relationship between the frequency of disturbance contained in the error signal PES and the peak frequency of the peak filter 35 in accordance with the phase of the error signal PES input from the error signal generation circuit 31 and the phase of the internal variable U input from the peak filter 35.

The error signal PES and the internal variable U are input into the frequency estimating section 42 on the sampling basis. The frequency estimating section 42 determines the comparative level relation between the frequency levels on the basis of the input of the error signal PES and the internal variable U, and accumulates the respective relationship during the track following control.

Then, the frequency estimating section 42 outputs a comparative level relation accumulation result S to the frequency specifying section 44 before the seek control is started. The comparative level relation accumulation result S may be expressed as Equation 6 shown below.

$$\begin{aligned} S &= \sum_n PES(n-1) \cdot U(n) \qquad \text{Equation 6} \\ &= [\cos(2\pi \cdot f \cdot Ts) - \cos(2\pi \cdot f_0 \cdot Ts)] \cdot \\ & \quad R^2 \sum_n [1 - \cos(2 \cdot (2\pi \cdot n \cdot f \cdot Ts + \Omega))] \end{aligned}$$

In the above, the disturbance frequency is f, the peak frequency of the peak filter 35 is $f_0$, the sampling interval is $T_S$, and the internal variable U in this particular case is $U(n)=R\sin(2_\pi \cdot n \cdot f \cdot T_S + \Omega)$.

The addition (integration) is performed during the period of time of the track following control and terminates before the seek control is started, thereby to define the comparative level relation accumulation result S.

In accordance with the sign (+, −) of the comparative level relation accumulation result S thus obtained, the comparative level relation between the frequency of disturbance contained in error signal PES and the peak frequency of the peak filter 35 during the period of time of the track following control is determined.

Subsequently, the frequency specifying section 44 determines an update range of the peak frequency of the peak filter 35 in accordance with the comparative level relation accumulation result S input from the frequency estimating section 42, outputs an update signal Fr, and updates the peak frequency of the peak filter 35 by the determined update range. Thereby, the peak frequency of the peak filter 35 may be approximated to the disturbance frequency.

According to the present embodiment, the frequency specifying section 44 determines an update amount dE of a parameter E representative of the peak frequency, and updates the parameter E included in the internal variable U of the peak filter 35 (refer to Equations 1 and 2).

Further, past comparative level relation accumulation results S obtained corresponding to respective operations of track following control are stored in the memory of the main control circuit 10. The frequency specifying section 44 determines the update amount dE in accordance with the accumulation result S input from the frequency estimating section 42 and the past accumulation result S.

Figures 5, 6:
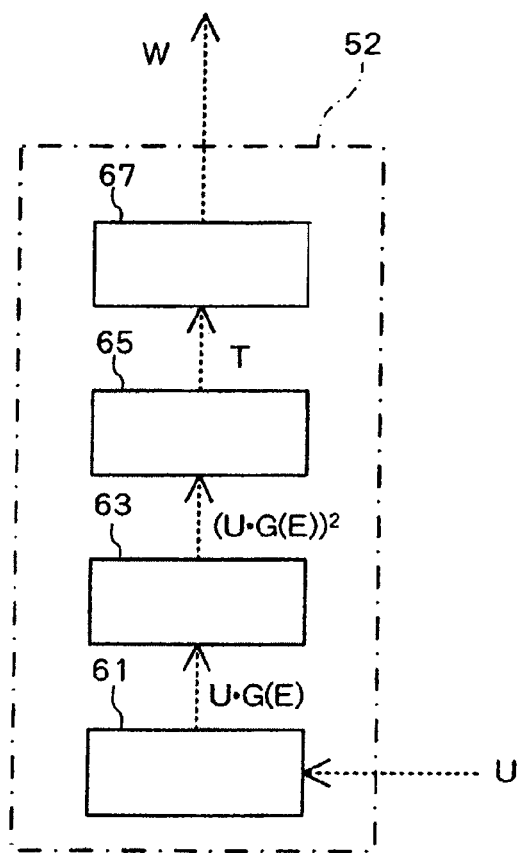
FIG. 5 is a view showing examples of determinations in an update amount dE of a peak frequency.
FIG. 6 is a block diagram showing an example of a functional configuration of an intensity estimating section.

FIG. 5 shows an example of determination of the update amount dE. As shown in the drawing figure, the update amount dE is determined corresponding to a number of successive times N of a sign of accumulation results S from the past. More specifically, in the case of successive accumulation results S, the peak frequency of the peak filter 35 and the disturbance frequency deviate from one another, so that the update amount dE is increased as the successive number increases.

The update amount dE may be specified to be the value of the successive number of times N, for example. When the number of successive times of a sign of past accumulation results S is N in accordance with the accumulation results S input from the frequency estimating section 42, the update amount dE is specified to be N. Alternatively, when the number of successive times N exceeds an upper limit value of the update amount dE, the update amount dE is specified to be the upper limit value. When the accumulation result S input from the frequency estimating section 42 is 0, the update amount dE is specified to be zero.

As described above, the update amount dE of the parameter E, which is representative of the peak frequency, is increased corresponding to the number of successive times N of the sign of the accumulation results S. Thereby, even when the peak frequency of the peak filter 35 and the disturbance frequency deviate from one another, the period of time until the disturbance is suppressed may be reduced. As described above, according to the present embodiment, the restriction on the update amount dE of the filtering characteristic is alleviated, so that even the update amount dE thus determined is possible.

Further, according to the present embodiment, when the accumulation result S of the comparative level relation and the update amount dE of the parameter E are obtained, calculations including divisions involving a large number of calculations, such as for obtaining averages, are not carried out. Hence, loads of calculations associated with the control are reduced.

Gain Updating Unit 50

The gain specification updating unit 50 included in the specification updating circuit 39 will be described herebelow. As shown in FIG. 2, the gain specification updating unit 50 includes an intensity estimating section 52 and a gain specifying section 54.

The intensity estimating section 52 estimates the intensity of disturbance contained in the error signal PES in accordance with the internal variable U input from the peak filter 35. As indicated in Equations 1 and 2, the internal variable U includes the error signal PES, and varies in correspondence to the error signal PES.

According to the present embodiment, the internal variable U of the peak filter 35 is used to evaluate the intensity of a frequency component of the error signal PES, which is to be suppressed by the peak filter 35. For example, in the event that the peak frequency of the peak filter 35 has been converged to the disturbance frequency, the value of the internal variable U is reduced as the disturbance is suppressed. Hence, the internal variable U represents the relationship between the peak gain of the peak filter 35 and the intensity of disturbance contained in the error signal PES.

More specifically, as shown in FIG. 6, the intensity estimating section 52 includes a correcting section 61, a squaring section 63, a maximum value acquiring section 65, and a low pass filter 67.

The correcting section 61 performs a multiplication of the internal variable U, which is input from the peak filter 35, by a correction value G(E) corresponding to the peak frequency, and outputs U·G(E) obtained through the multiplication. The internal variable U is input into the correcting section 61 on the sampling basis. During the period of time of track following control, the correcting section 61 obtains and outputs U·G(E) each time the internal variable U is input.

The squaring section 63 outputs $(U \cdot G(E))^2$ obtained by squaring U·G(E) input from the correcting section 61.

The maximum value acquiring section 65 acquires $(U \cdot G(E))^2$ input from the squaring section 63 on the sampling basis during the period of time of track following control, obtains a maximum value T from among the acquired values $(U \cdot G(E))^2$, and outputs it before the seek control is started. Hence, the maximum value T is output on the basis of track following control. The maximum value T is expressed as Equation 7 shown below.

$$T = \max((U \cdot g(E))^2) \qquad \text{Equation 7}$$

The low pass filter 67 performs filtering the maximum value T input on the basis of the track following control, and outputs a value obtained thereby to the gain specifying section 54 as an intensity evaluation value W that represents the intensity of the disturbance. Filtering by the low pass filter 67 is expressed as Equation 8 shown below.

$$W = \frac{(1-c)}{z-c} \cdot T = \frac{(1-c)}{z-c} \cdot \max((U \cdot g(E))^2) \qquad \text{Equation 8}$$

Figure 7:
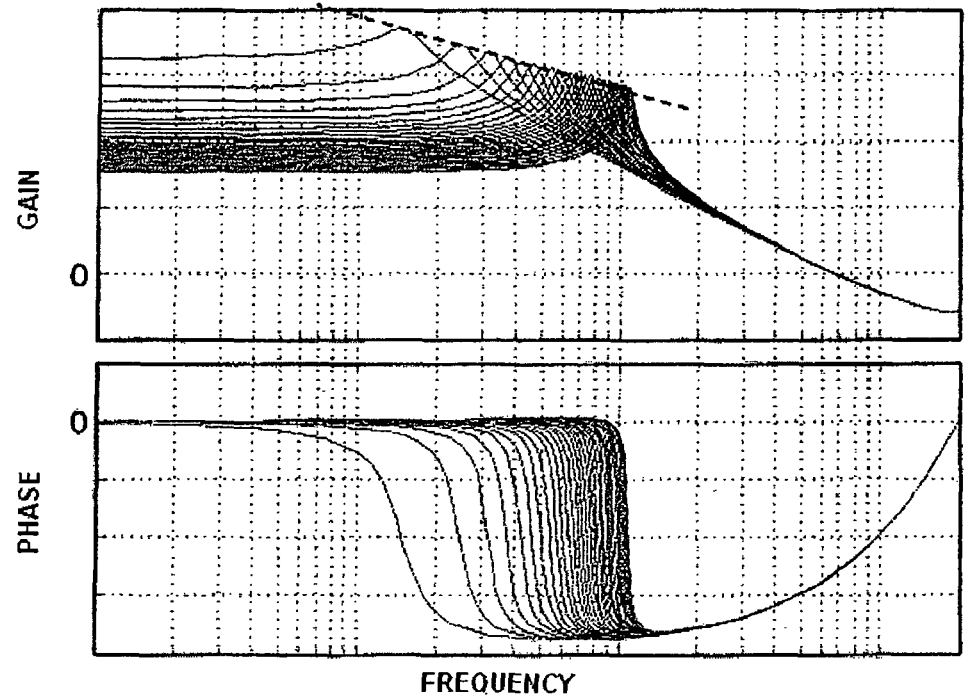
FIGS. 7(a) and 7(b) show explanatory views related to correction values.
Figure 7:
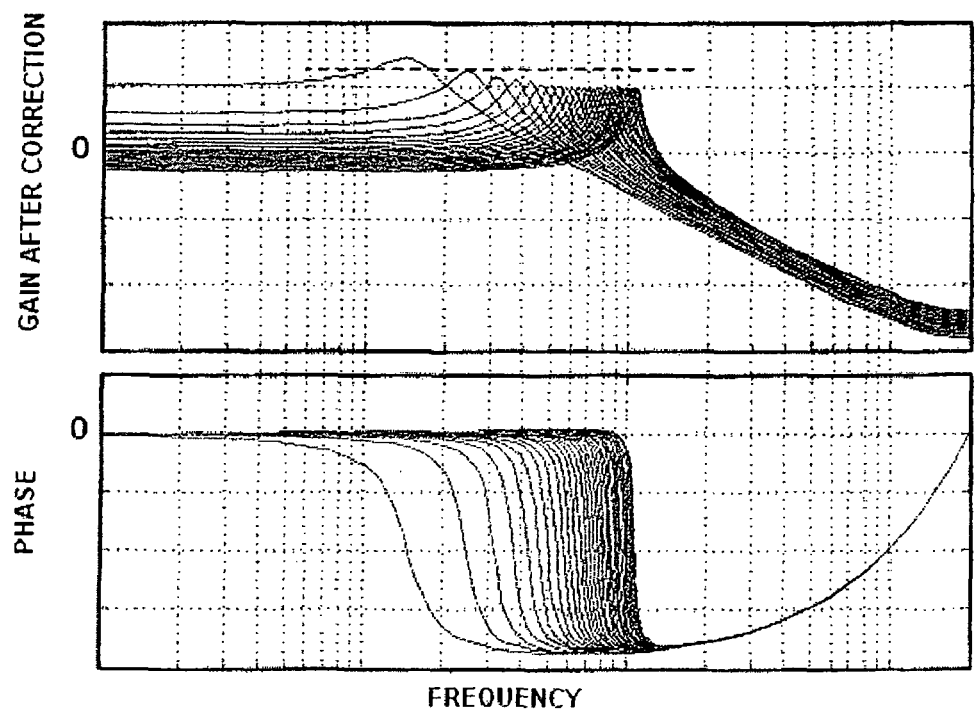

As described above, the correcting section 61 perform is the multiplication of the internal variable U by the correction value G(E). As shown in FIG. 7(a), the peak gain in the frequency characteristics from the input to internal variable U of the peak filter 35 is dependent on the peak frequency and is, therefore, not constant. Hence, the multiplication is performed to prevent a reference for estimating the disturbance intensity from being changed.

As such, the multiplication of the internal variable U by the correction value G(E) is performed as described, whereby, as shown in FIG. 7(b), the peak frequency after correction is made to be substantially constant. This makes it possible to accomplish uniform estimation, regardless of the peak frequency. The correction value G(E) is specified to have a value corresponding to a differential between the respective peak gain and a predetermined reference value over a range adoptable for the peak frequency.

Concurrently, the correction value G(E) is specified so that the peak gain is slightly greater than other frequency bands in low frequency bands within the range adoptable for the peak frequency. The correction value G(E) is thus specified to make it possible to specify even higher gains because stability of the servo system is relatively high in the low frequency bands.

Further, the reason that the squaring section 63 performs the square of the multiplication U·G(E) is to increase the differential between the peak frequency band and another frequency band to thereby reduce the influence of the other frequency band.

Further, the maximum value acquiring section 65 outputs the maximum value T. This is done for the reason that, even when an intermittent disturbance, such as RV disturbance, intermittently acts during the period of time of track following control, the intensity of the disturbance may be evaluated. Further, calculations including divisions involving a large number of calculations, such as for obtaining averages, are not carried out. Hence, the loads of calculations associated with the control are reduced.

Further, the low pass filter 67 performs filtering of the maximum value T. This is done for the reason that, when the intermittent disturbance, such as RV disturbance, acts, the maximum value T significantly fluctuates on the basis of track following control, so that the filtering is performed to prevent the above.

Subsequently, the gain specifying section 54 determines the level of the peak gain of the peak filter 35 in accordance with the intensity evaluation value W input from the intensity estimating section 52 and outputs the update signal Gn, thereby to update the peak gain of the peak filter 35 to the determined level. Thereby, the peak gain of the peak filter 35 may be approximated to a level at which the disturbance is suppressed.

According to the present embodiment, the gain specifying section 54 changes the value of the bit shift amount OSHCNT, which is used to adjust the gain, thereby to adjust the gain of the peak filter 35 and to update the level of the peak gain (refer to Equations 3 and 4).

Further, a gain specification table as shown in FIG. 8 is stored in the memory or the like of the main control circuit 10. The gain specifying section 54 determines the level of the peak gain in accordance with the intensity evaluation value W input from the intensity estimating section 52. Furthermore, instead of the gain specification table, it is possible that an equation for determining the level of the peak gain may be incorporated into a program.

In the gain specification table, there are discretely provided threshold values (increasing threshold values) of the intensity evaluation value W, which are used in the event of increasing the level of the peak gain, and threshold values (reducing threshold values) of the intensity evaluation value W, which are used in the event of decreasing the level of the peak gain.

For the respective levels, the decreasing threshold values are specified to be lower than the increasing threshold values.

According to the gain specifying section 54, when the intensity evaluation value W input from the intensity estimating section 52 is larger than an increasing threshold value corresponding to the current bit shift amount OSHCNT, the value of the bit shift amount OSHCNT is increased to specify the gain to be 2 times as large. Alternatively, when the intensity evaluation value W is smaller than the reducing threshold value, the value of the bit shift amount OSHCNT is reduced to specify the gain to be ½ times as large.

In the gain specification table, the reducing threshold values are thus specified to be lower than the increasing threshold values. This is done for the reason that, in the event that the degree of disturbance suppression is increased by increasing the peak gain of the peak filter 35, the error signal PES is decreased by the event, thereby resulting in a reduction in the internal variable U of the peak filter 35. As such, it may prevent the peak gain of the peak filter from chattering.

Further, the gain specifying section 54 changes the value of the bit shift amount OSHCNT, thereby to change the gain of the peak filter 35 to be 2 or ½ times as large. However, as described above, according to the present embodiment, even such a discontinuous change in gain is tolerated since the restriction on the update amount dE of the filtering characteristic is alleviated. Further, since the value of the bit shift amount OSHCNT is changed, the number of calculations is small, so that the loads of calculations associated with the control are reduced.

In association with the start of the seek control, the specification updating circuit 39 changes the internal variable U of the peak filter 35. In this case, when the seek distance of the magnetic head 4 is larger than a predetermined value, the internal variable U of the peak filter 35 is initialized to 0.

On the other hand, when the magnetic head 4 is smaller than the predetermined value, a new internal variable U is determined in accordance with the internal variable U having been applied. More specifically, when the gain specifying section 54 specifies the gain of the peak filter to be 2 times as large, it specifies the internal variable U to be ½ times as large while when the gain specifying section 54 specifies the gain of the peak filter to be ½ times as large, it specifies the internal variable U to be 2 times as large. According to the above, the output value $Pk_{out}$ of the peak filter 35, which value is shown in Equations 3 and 4, may be specified not to cause discontinuity in the event of changing the gain.

An example of an experiment in the case where disturbance (RV disturbance) resulting from rotation vibrations was caused to act on a magnetic disk drive configured as described above will be described hereinbelow. In the present experiment, an other magnetic disk drive was disposed near the experiment-target magnetic disk drive, and the other magnetic disk drive was caused to iterate random seek control, whereby rotation vibrations were imparted to the experiment-target magnetic disk drive. Further, in this state, the experiment-target magnetic disk drive was caused to measure the error signal PES during the track following control.

Figure 9:
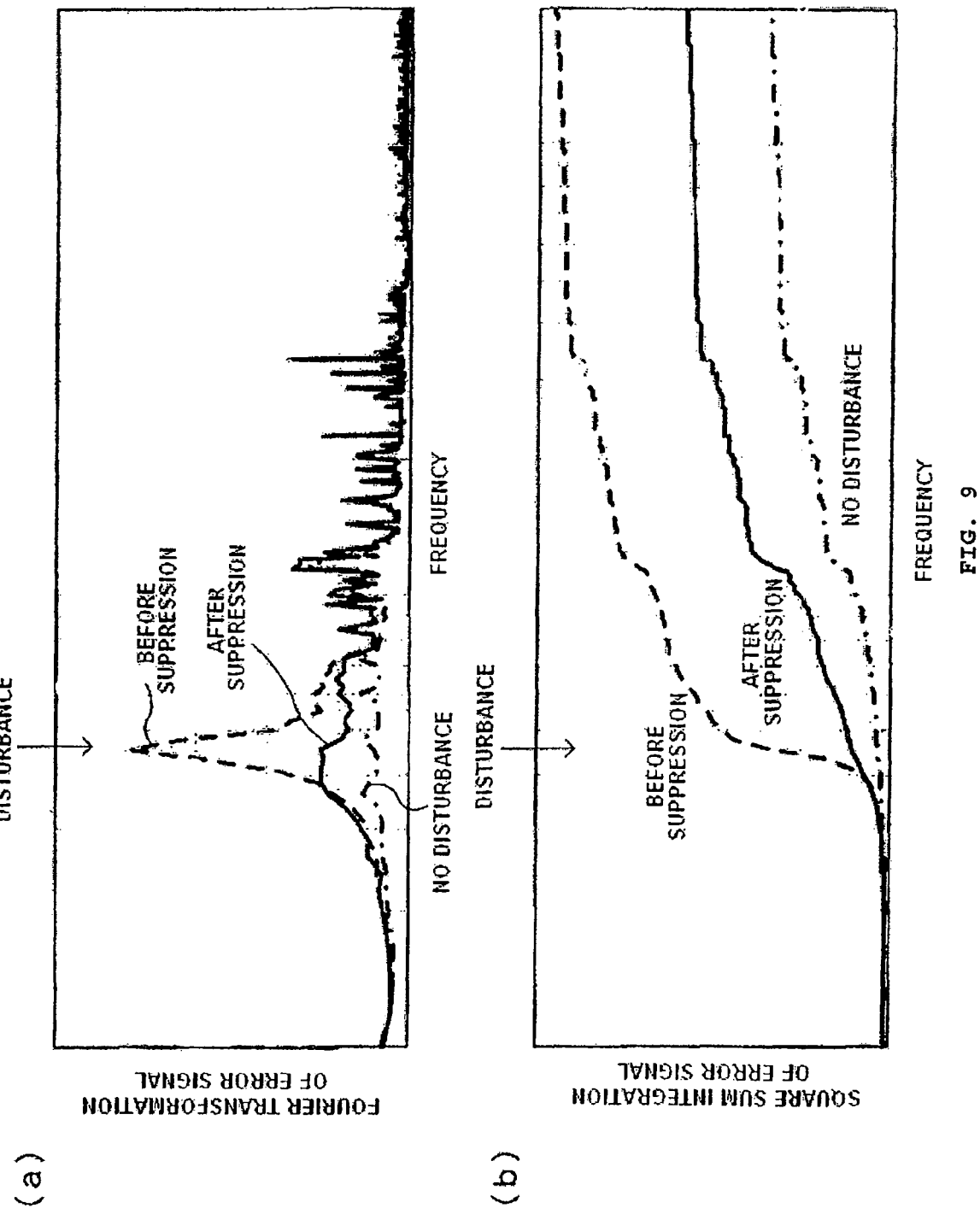
FIGS. 9(a) and 9(b) show explanatory views of effects of embodiments of the present invention.

FIGS. 9(a) and 9(b) show a state of the error signal PES before occurrence of RV disturbance (without disturbance), a state of the error signal PES immediately after subsequent occurrence of the RV disturbance (before suppression), and a state of the error signal PES after iteration of the seek control (after the suppression). FIG. 9(a) shows a Fourier transformation of the error signal PES, and FIG. 9(b) shows a square sum integration of the error signal PES.

According to FIGS. 9(a) and 9(b), it may be known that the RV disturbance is suppressed after iteration of the seek control.

FIGS. 10(a) and 10(b) show a state transition of the error signal PES in the event the seek control is iterated in the state where RV disturbance has occurred. FIG. 10(a) shows a Fourier transformation of the error signal PES, and FIG. 10(b) shows a square sum integration of the error signal PES. In these drawing figures, the state of the error signal PES is shown by being shifted downward corresponding to the number of seeks.

According to FIGS. 10(a) and 10(b), it may be known that the RV disturbance is suppressed while the seek control is being iterated.

Figure 10:
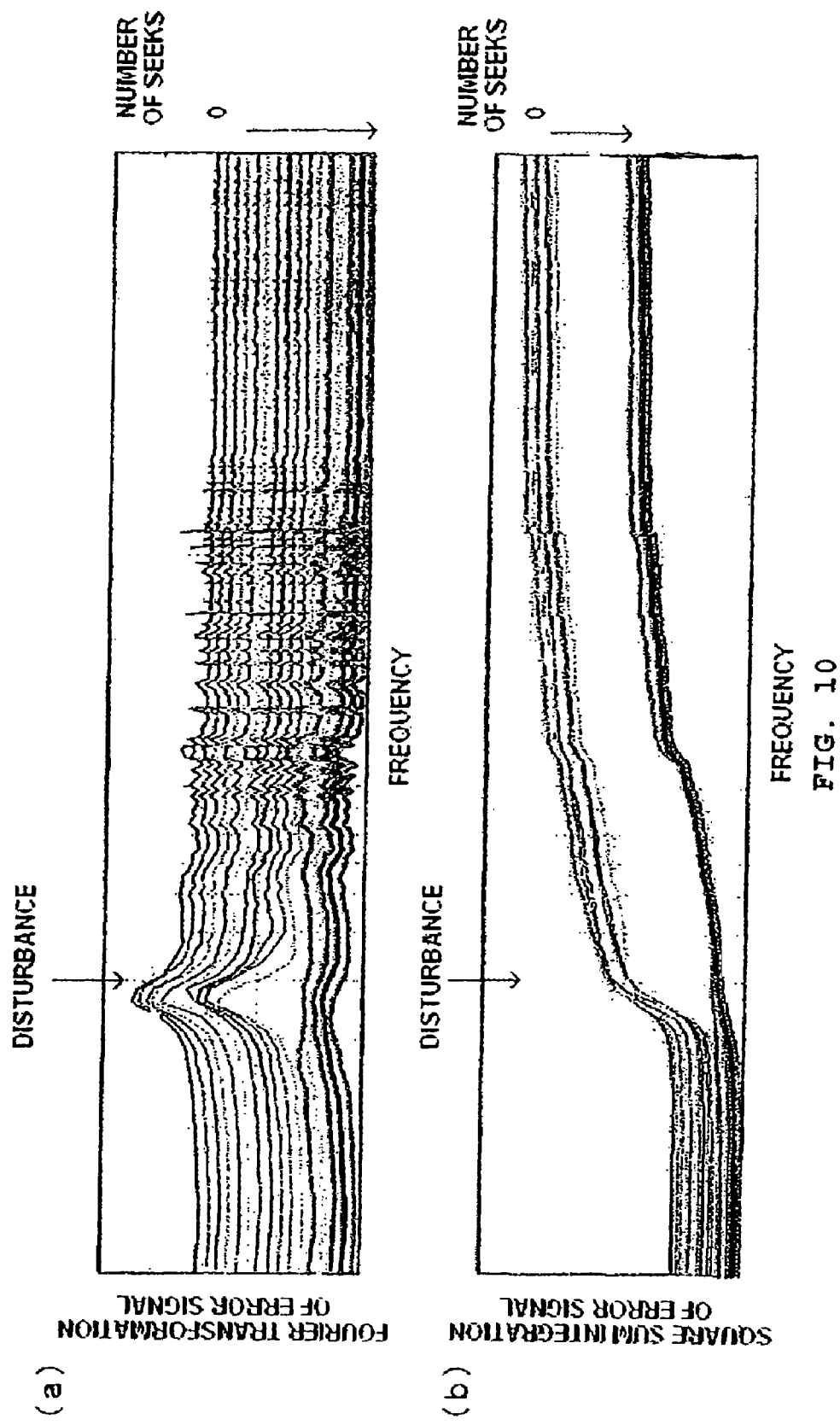
FIGS. 10(a) and 10(b) show explanatory views of effects of embodiments of the present invention.
Figure 11:
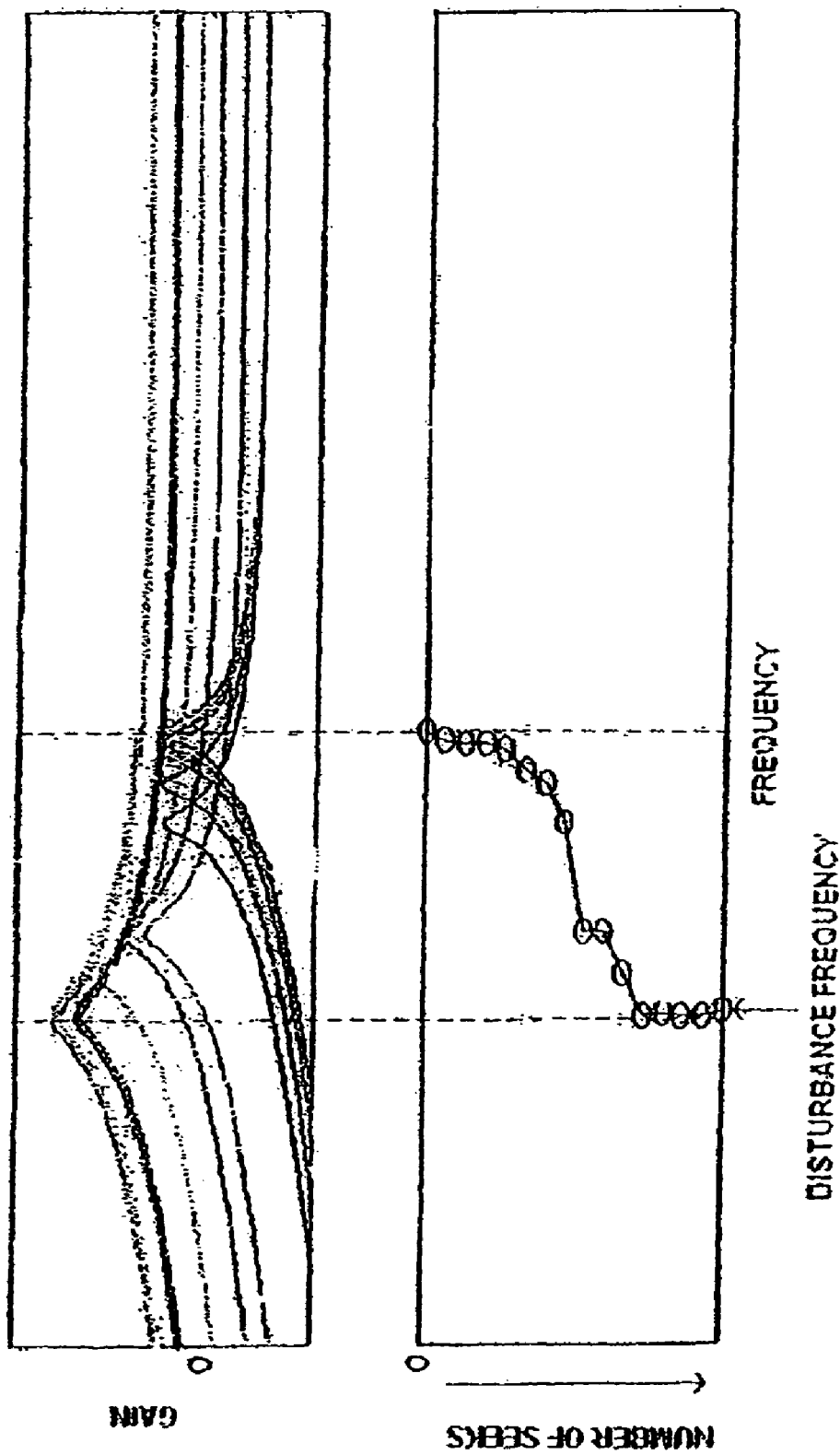
FIG. 11 shows explanatory views of effects of embodiments of the present invention.

FIG. 11 shows a transition of gain characteristics of the peak filter in the case of FIG. 10. Further, the lower part of the drawing figure is a view of the peak frequency of the peak filter in the aforementioned case, in which the frequency is plotted by being shifted downward corresponding to the number of seeks.

According to FIG. 11, it may be known that the peak frequency of the peak filter is converged into the frequency of the RV disturbance as the seek control is iterated. Further, with the progress of convergence of the peak frequency, the peak gain of the peak filter is progressively increased and converged to the level causing suppression of the intensity of the RV disturbance.

While the embodiments of the present invention have been described above, the present invention is not limited to the form of the embodiments.

For example, in the case where multiple disturbances resulting from external vibrations occur, multiple peak filters may be provided so that the peak frequencies of the respective peak filters are converged to the respective disturbances. Further, it may be that multiple peak filters are provided, and frequency bands different from one another are allocated for the respective peak filters 35. In such a case where multiple peak filters are provided, upper limits are preferably provided on the peak gains of the respective peak filters to prevent the phase lags from being excessively increased.

What is claimed is:

1. A magnetic disk drive comprising:
a magnetic disk whereon data is recorded on a plurality of tracks;
a magnetic head that moves relative to the magnetic disk to read out the data;
an error signal generation circuit that, in accordance with data read out by the magnetic head, generates an error signal indicative of a position error of the magnetic head with respect to a target track determined from among the plurality of tracks;
a filter circuit that filters the error signal in correspondence to a filtering characteristic specified;
a position control circuit that alternately executes track following control and seek control, the track following control causing the magnetic head to follow the target track in accordance with the error signal filtered, and the seek control causing the magnetic head to move towards a new target track that is a track other than the target track; and
a specification updating circuit that determines the filtering characteristic, which is specified in the filter circuit, in accordance with the error signal generated during a period of time when the track following control is being executed and that specifies the determined filtering characteristic in the filter circuit in association with start of the seek control that is executed before a subsequent track following control, wherein the specification updating circuit comprises:
a frequency estimating section that estimates a frequency of a disturbance contained in the error signal generated during the period of time when the track following control is being executed, and that determines a comparative level relation between the frequency of the disturbance and a peak frequency of the filter circuit based on the period of time when the track following control is being executed;
a frequency specifying section that specifies the peak frequency of the filter circuit according to the estimated frequency of the disturbance, and that determines an update range of the peak frequency of the filter circuit based on a comparative level relation determined during a target period of time and a comparative level relation determined during a previous period of time;
an intensity estimating section that estimates an intensity of a disturbance contained in the error signal generated during the period of time when the track following control is being executed, wherein the intensity estimating section estimates the intensity of the disturbance in accordance with an internal variable of the filter circuit, the internal variable changing in correspondence to the magnitude of the error signal, wherein the error signal and the internal variable is input from the error signal generation circuit and a peak filter, respectively, on a sampling basis, and the filtering characteristic is not updated on the sampling basis, the filtering characteristic being specified in association with the start of the seek control, thereby alleviating restrictions on an update range of the filtering characteristic; and
a gain specifying section that specifies a gain of the filter circuit in correspondence to the estimated intensity of the disturbance.

2. The magnetic disk drive according to claim 1, wherein the specification updating circuit specifies at least one of a gain (peak gain) and a center frequency (peak frequency) of the filter circuit as a filtering characteristic.

3. The magnetic disk drive according to claim 1, wherein the intensity estimating section estimates the intensity of the disturbance in accordance with a value (intensity evaluation value) obtained by multiplying the internal variable of the filter circuit by a correction value corresponding to the peak frequency of the filter circuit.

4. The magnetic disk drive according to claim 1, wherein the intensity estimating section estimates the intensity of the disturbance in accordance with a maximum value of the intensity evaluation value during the period of time when the track following control is being executed.

5. The magnetic disk drive according to claim 1, wherein according to the gain specifying section, in relation to a threshold value of the intensity evaluation value in a case where the gain of the filter circuit is increased from a predetermine level, a threshold value in a case where the gain of the filter circuit is decreased from a predetermined level is specified to be low.

6. The magnetic disk drive according to claim 1, wherein the gain specifying section causes the internal variable of the filter circuit to be reduced in association with causing the gain of the filter circuit to be increased, and causes the internal variable of the filter circuit to be increased in association with causing the gain of the filter circuit to be reduced.

7. A control method for a magnetic disk drive, wherein the control method operates for a magnetic disk drive set as a target including:
- a magnetic disk wherein on data is recorded on a plurality of tracks;
- a magnetic head that moves relative to the magnetic disk to read out the data;
- an error signal generation circuit that, in accordance with data read out by the magnetic head, generates an error signal indicative of a position error of the magnetic head with respect to a target track determined from among the plurality of tracks;
- a filter circuit that filters the error signal in correspondence to a filtering characteristic specified; and
- a position control circuit that alternately executes track following control and seek control, the track following control causing the magnetic head to follow the target track in accordance with the error signal filtered, and the seek control causing the magnetic head to move towards a new target track that is an other track than the target track, the control method comprising:
- determining the filtering characteristic, which is specified in the filter circuit, in accordance with the error signal generated during a period of time when the track following control is being executed, wherein determining the filter characteristic comprises estimating a frequency of a disturbance contained in the error signal generated during the period of time when the track following control is being executed;
- specifying the determined filtering characteristic in the filter circuit in association with start of the seek control that is executed before a subsequent track following control, wherein specifying the determined filtering characteristic comprises specifying a peak frequency of the filter circuit according to the estimated frequency of the disturbance;
- determining a comparative level relation between the frequency of the disturbance and a peak frequency of the filter circuit based on the period of time when the track following control is being executed;
- determining an update range of the peak frequency of the filter circuit based on a comparative level relation determined during a target period of time and a comparative level relation determined during a previous period of time;
- estimating an intensity of a disturbance contained in the error signal generated during the period of time when the track following control is being executed, wherein the intensity estimating section estimates the intensity of the disturbance in accordance with an internal variable of the filter circuit, the internal variable changing in correspondence to the magnitude of the error signal, wherein the error signal and the internal variable is input from the error signal generation circuit and a peak filter, respectively, on a sampling basis, and the filtering characteristic is not updated on the sampling basis, the filtering characteristic being specified in association with the start of the seek control, thereby alleviating restrictions on an update range of the filtering characteristic; and
- specifying a gain of the filter circuit in correspondence to the estimated intensity of the disturbance.

* * * * *